United States Patent Office 3,196,754
Patented July 27, 1965

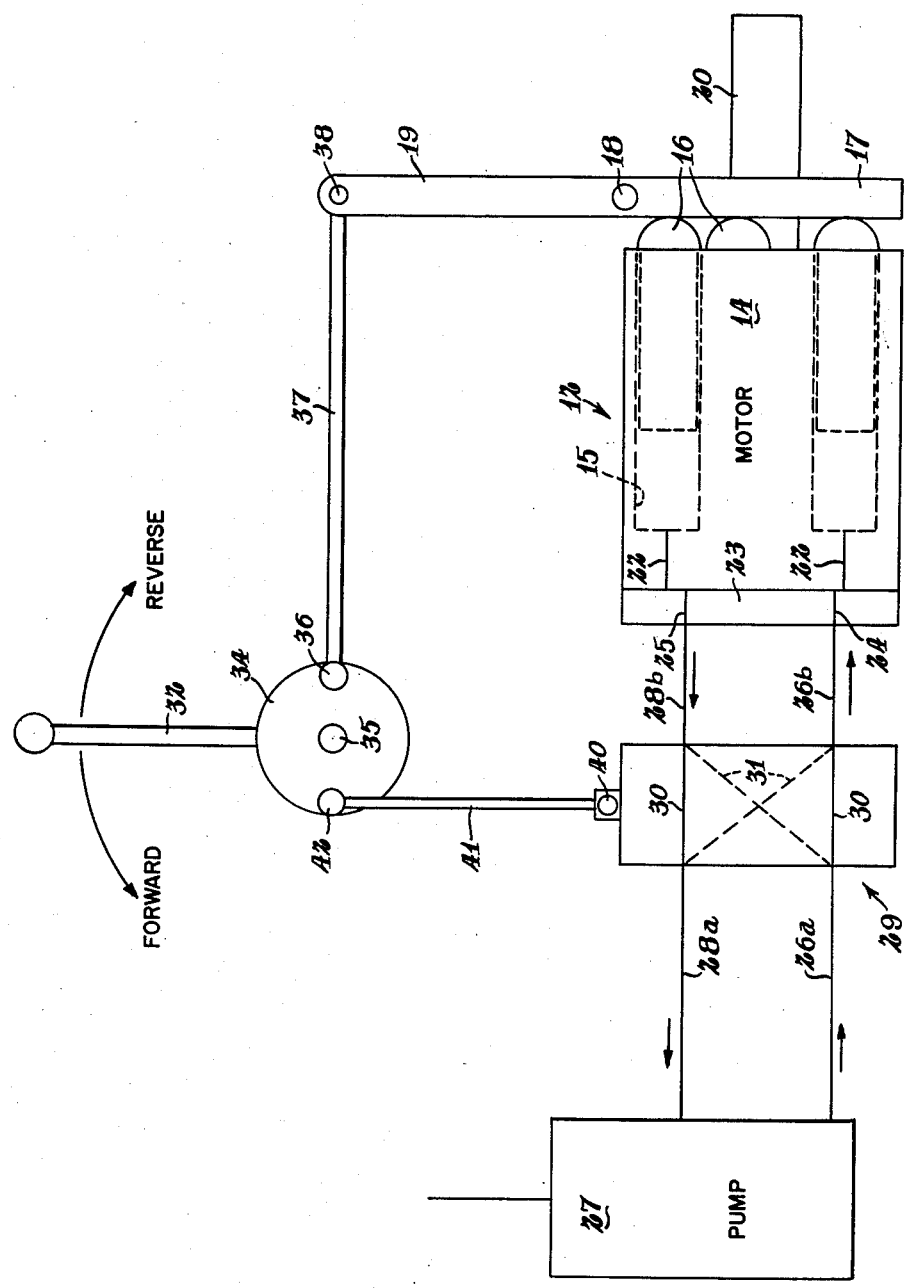

3,196,754
MOTOR CONTROL SYSTEM
Stephen S. Baits, Rockford, Ill., assignor to Sundstrand Corporation, a corporation of Illinois
Filed Dec. 23, 1963, Ser. No. 332,409
6 Claims. (Cl. 91—199)

This invention relates to controls for hydraulic motors and more particularly to a control for providing a variable reversible output from a motor having means for varying its displacement in only one direction from neutral.

Many variable displacement motors are basically adaptable to operation at equal positive and negative displacements so that with fluid flow through the motor in one direction the output may be reversed by varying displacement in opposite directions from neutral. Such motors are sometimes described as symmetrical devices. However, there are some advantages in specific motor constructions with means for varying displacement in only one direction from netural. These devices are sometimes described as unsymmetrical, and they lack the advantage of being useful in applications where symmetrical output is required. With the above in mind, it is a general object of the invention to provide a new and improved motor control for supplying a symmetrical output from an unsymmetrical motor.

A more specific object is to provide a new and improved control of the type described including a selectively operable control member movable in forward and reverse directions from neutral to effect the same adjustment of displacement in the motor, together with means for reversing fluid flow through the motor on movement of the control member in opposite directions from neutral thereby to provide reversible output from the motor.

Other objects and advantages will become readily apparent from the following detailed description taken in connection with the accompanying drawing, in which:

The single figure is a diagrammatic illustration of a control system embodying the principles of the present invention.

While an illustrative embodiment of the invention is shown in the drawing and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

Although the invention may be used in connection with various specific unsymmetrical motor constructions, for purposes of illustration, it has been shown herein as associated with an axial piston motor 12 diagrammatically illustrated as provided with means for varying its displacement in only one direction from a minimum displacement value.

In the illustration, motor 12 includes a rotatable cylinder block 14 having a series of axially disposed cylinders 15 which usually are arranged in an annular array concentric about the axis of the cylinder block. Cylinders 15 receive pistons as at 16 reciprocably mounted therein and having outer ends adapted to bear against a cam plate or swashplate 17 pivotally mounted as at 18 for movement in a counterclockwise direction from a minimum displacement position as illustrated to a maximum displacement position inclined substantially relative to the end face of the cylinder block.

For purposes of adjusting the angular disposition of the cam plate or swashplate 17 to vary the stroke of the pistons 16, the swashplate is suitably formed for connection with an actuating mechanism, and as illustrated herein, the swashplate is provided with an arm extension 19 connected with control mechanism described presently.

In a motor of the type described herein, in which the cylinder block is rotatable relative to a stationary though adjustable swashplate, the motor preferably includes a shaft as at 20 suitably connected to the cylinder block 14 to rotate with the cylinder block and provide an output.

The cylinders 15 in the cylinder block preferably communicate with the end face of the cylinder block remote from the swashplate by means of inlet-outlet ports 22 extending from the ends of the cylinders to the end face of the block. In order to supply fluid to and withdraw fluid from the ports 22 as the cylinder block rotates, the end face of the cylinder block bears against the cooperating face of a valve plate 23 stationarily supported and provided in a conventional manner with an arcuate kidney-shaped inlet-outlet port as at 24 and a similar outlet-inlet port as at 25, both concentric about the axis of cylinder block rotation and adapted to communciate successively with the ports 22 upon rotation of the cylinder block. As is well understood in the art, the ports 24 and 25, either of which may function as inlet or outlet, lie in the plane of the port plate, normal to the plane of the paper, and are disposed symmetrically about a plane concident with the axis of the drive shaft and parallel to the plane of the paper, so that, upon the supply of pressure fluid to one of the ports 24 and 25, the pistons are forced outwardly of the cylinders and slide along the inclined swashplate, thereby to rotate the cylinder block in a direction dependent upon which of ports 24 and 25 is supplied with high pressure fluid.

In the illustration herein, the pressure fluid is supplied to the motor by means of a pump of any preferred construction as illustrated at 27, having its output connected to a supply line as at 26a and its intake connected to a return line as at 28a. As will be described presently, the conduits 26a and 28a communicate with a valve apparatus 29 which is adapated to place the supply conduit 26a in communication with either of two passages 26b and 28b leading respectively to the ports 24 and 25, and to communicate the return conduit 28a with the other of the passages 26b and 28b.

The valve apparatus 29 may be of a conventional type including a movable valve member adapted upon movement downwardly from the position illustrated to connect the passages 26a and 26b while connecting the passages 28a and 28b as by porting 30. Upon movement of the valve member upwardly from the position illustrated, passages 26a and 28b are connected while passages 28a and 26b are connected as by porting 31.

In operation, with the pump 27 continuously delivering fluid under pressure through the conduit 26a, the valve 29 may be operated to supply such fluid under pressure selectively to either the ports 24 and 25.

According to the present invention, the valve 29 is controlled by a manually accessible handle 32 which is also connected to control the variable angle of the swashplate 17 in a manner such that the output shaft 20 is adapted to be driven at variable speeds in opposite directions. More specifically, in an illustrative embodiment, the manual handle 32 is preferably an extension from a crank disc 34 pivotally mounted as at 35 and having an eccentric pivotal connection as at 36 with a link 37 in turn pivotally connected as at 38 to the swashplate extension arm 19. By virtue of the arrangement illustrated, it will be understood that upon movement of the handle 32 in either direction from the neutral center position illustrated, the link 37 will be drawn to the left in the illustration, pivoting the swashplate in a counterclockwise direction to increase the displacement of the motor, that is, the stroke of the pistons 16, to a predetermined maximum stroke if desired. Conversely, upon return of the handle toward the neutral position illustrated, the swashplate is returned toward the minimum displacement position illustrated. It will be understood that the displacement of the motor is variable in only one direction from the minimum displacement position illustrated and that the illustrated motor may be described as one of the unsymmetrical type.

For purposes of obtaining symmetrical output from the unsymmetrical motor, the movable valve member in valve apparatus 29 is pivotally connected as at 40 with link 41 in turn pivotally connected as at 42 to the crank disc 34. By virtue of such arrangement, the movable valve member is moved downwardly upon movement of the handle in a counterclockwise direction to the left, which may be described as "Forward," and upwardly when the handle is moved in a clockwise direction to the right, which may be described as a "Reverse" direction.

It will be understood that the simultaneous control of the motor displacement and the valve apparatus 29 from a single control facilitates use of the unsymmetrical motor in applications where symmetrical output is required since reverse movement of the movable valve member reverses the direction of flow of pressure fluid through the motor 12 as the motor is put in stroke. Specifically, as the manual handle is moved "Forward," the displacement of the motor is increased and the valve 29 connects conduit 26a to passage 26b and connects conduit 28a to passage 28b to supply fluid for driving the motor and its output shaft in a forward direction. If the handle is moved in a "Reverse" direction from the neutral, the motor displacement is varied similarly but valve 29 connects conduit 26a to passage 28b and connects conduit 28a to passage 26b, so that the motor and output shaft are driven reversely.

I claim:

1. A controlled motor system comprising an adjustable displacement reversible hydraulic motor drivable by fluid pressure for translating the fluid pressure into rotational movement of an output shaft, said motor having an inlet and an outlet, a first passage normally in fluid communication with the inlet for supplying fluid to the motor, a second passage normally in fluid communication with the outlet for returning fluid from the motor, means for varying the displacement of the motor in a single range in one direction from a minimum displacement value, manually operable means movable in forward and reverse directions from a neutral center position and controlling the displacement varying means in said one range adapted to increase displacement of the motor upon movement away from neutral position in either direction and to decrease displacement to a minimum value upon movement to said neutral position from either direction, and means for cross-connecting the first and second passages respectively to said outlet and said inlet responsive to movement of said manually operable means from said neutral position in the reverse direction.

2. In a fluid handling system, a piston-type adjustable stroke hydraulic motor including: a rotatable cylinder block, a cam, a plurality of reciprocating pistons in cylinders in said block and engaging said cam, an output shaft mounted for rotation with said cylinder block, a fluid inlet, a fluid outlet, valve means communicating said inlet and outlet successively with each of the cylinders of said block, and means for adjusting said cam relative to said block for varying the displacement of the motor in a single range on one side of a minimum displacement value; a passage for conducting fluid to or from said inlet; a passage for conducting fluid from or to said outlet; selectively operable control means movable in opposite directions from a neutral center position and controlling the displacement varying means on said one side; a source of fluid under pressure for continuously driving said motor; a high pressure conduit for conducting fluid from said source; a return conduit for conducting relatively lower pressure fluid; valve means for reversibly connecting either of said conduits to the inlet passage and the other conduit to the outlet passage; and means for controlling said valve means to reverse the connection of said inlet passage and said outlet passage with respective ones of said high pressure conduit and said lower pressure conduit upon movement of said control means in opposite directions from neutral.

3. In a fluid handling system, a variable displacement hydraulic motor including a shaft for delivering an output from the motor, a fluid inlet, a fluid outlet, and means for varying the displacement of the motor in a single range in one direction from a minimum displacement value, a source of pressure fluid, a control member movable in opposite directions from a neutral center position, and connected to the displacement varying means to vary the displacement of the motor similarly upon movement in either direction from neutral, and valve means controlled by said member for connecting the source to the inlet upon movement of the member in one direction from neutral to drive the shaft in one direction and for connecting the source to the outlet upon movement of the member in the opposite direction from neutral to drive the shaft in the opposite direction.

4. A system for controlling an adjustable displacement rotary hydraulic motor including a cylinder block having a circular array of cylinders, a plurality of reciprocating pistons mounted in the cylinders in said block with piston ends extending therefrom, an adjustable member providing a surface engaging the extending piston ends, said surface and cylinder block being rotatable relative to each other, means for adjusting said adjustable member to vary the displacement of said motor in one direction, two separate passage means communicating successively with cylinders of said block during relative rotation of said block and adjustable member, and separate conduit means connected respectively to said passages for conducting fluid toward and away from said passages, which system comprises selectively operable means including a lever movable in opposite directions from a neutral center position and controlling said adjusting means in said one direction, valve means for cross-connecting either of said separate conduits to either of said separate passages and the other conduit to the other passage, and means for reversing said valve means upon movement of said lever in opposite directions from said central position thereby to reverse flow through said passages.

5. In a fluid handling system, a reversible rotary fluid energy translating device having an inlet and an outlet, a supply passage for conducting fluid to the device, a return passage for conducting fluid from the device, means for varying the displacement of the device in a predetermined range in one direction only from a minimum displacement value to a maximum displacement value, selectively operable control means movable in forward and reverse directions from a neutral center position and controlling the displacement varying means to vary displacement in said predetermined range upon movement in either direction from neutral, and means responsive to movement of said control means for connecting the supply and return passages respectively to the inlet and outlet upon movement of the control means in one direction from neutral and for connecting the supply and return passages respectively to outlet and inlet upon movement of the means in the opposite direction from neutral.

6. In a hydraulic motor control system, an adjustable stroke hydraulic motor including: a rotatable cylinder block, a cam plate mounted for pivotal movement toward and away from said cylinder block, a plurality of axially reciprocable pistons in cylinders in said block and engaging said cam plate, an output shaft mounted for rotation with said cylinder block, a fluid inlet and a fluid outlet communicating successively with each of the cylinders of said block, and link means for pivoting said cam plate for inclining said cam plate relative to said block for varying the displacement of the motor in a predetermined range between a minimum displacement value and a maximum displacement value; a passage for conducting fluid to or from said inlet; a passage for conducting fluid from or to said outlet; a manual control pivotal crank movable in opposite directions from a neutral center position and pivotally connected with said link means for controlling the displacement varying means similarly on movement in either direction; a source of fluid under pressure for continuously driving said motor; a high pressure conduit for conducting fluid from said source, a drain conduit for conducting relatively lower pressure fluid; a valve for reversibly connecting either of said conduits to the inlet passage and the other conduit to the outlet passage; and link means pivotally connected to the control crank and pivotally connected to the valve means for controlling the latter to reverse the connection of said inlet passage and said outlet passage with respective ones of said high pressure conduit and said lower pressure conduit upon movement of the lever in opposite directions from the neutral position, thereby to drive the motor at variable speeds in opposite directions.

References Cited by the Examiner
UNITED STATES PATENTS

| | | | |
|---|---|---|---|
| 2,223,838 | 12/40 | Tweedale | 91—199 |
| 2,316,926 | 4/43 | Willett | 60—97 |
| 2,371,974 | 3/45 | Neuland | 91—199 |
| 2,383,429 | 8/45 | Wahlmark | 91—199 |

FRED E. ENGELTHALER, *Primary Examiner.*